(12) United States Patent
Kimble

(10) Patent No.: US 9,616,589 B2
(45) Date of Patent: Apr. 11, 2017

(54) VACUUM INFUSED REPAIR DEVICE AND METHOD FOR TEAK DECKS ON BOATS, YACHTS AND SHIPS

(76) Inventor: Michael Ray Kimble, San Diego, CA (US)

(*) Notice: Subject to any disclaimer, the term of this patent is extended or adjusted under 35 U.S.C. 154(b) by 1109 days.

(21) Appl. No.: 13/480,296

(22) Filed: May 24, 2012

(65) Prior Publication Data
US 2013/0312874 A1 Nov. 28, 2013

(51) Int. Cl.
| | |
|---|---|
| B29C 70/00 | (2006.01) |
| B27M 3/00 | (2006.01) |
| B63B 9/00 | (2006.01) |
| B63B 5/06 | (2006.01) |
| E04F 15/00 | (2006.01) |
| B27M 3/04 | (2006.01) |
| B29C 73/02 | (2006.01) |

(52) U.S. Cl.
CPC ............ *B27M 3/04* (2013.01); *B29C 73/025* (2013.01); *B63B 5/065* (2013.01); *B63B 9/00* (2013.01); *E04F 15/00* (2013.01)

(58) Field of Classification Search
CPC ....................................................... B63B 5/65
USPC .............................. 114/224; 264/36.1, 36.22
See application file for complete search history.

(56) References Cited

U.S. PATENT DOCUMENTS 4,942,013 A * 7/1990 Palmer ................ B29C 43/3642
156/285

2006/0155049 A1 * 7/2006 I'Abee ...................... B63B 5/02
524/556
2009/0176020 A1 * 7/2009 Vaerewyck ............. B27K 3/08
427/294

OTHER PUBLICATIONS

Ray, Steve, Cost Effective Restoration of Decay in Wooden Core Fiberglass Boats, Apr. 1, 2003.*
West System, Fiberglass Boat Repair & Maintenance, Gougeon Brothers, Mar. 2011.*
West System, Vacuum Bagging Techniques, Gougeon Brothers, Apr. 2010.*
rotdoctor.com, Wooden Boats, Nov. 6, 2006.*

* cited by examiner

*Primary Examiner* — Jeffrey Wollschlager
*Assistant Examiner* — Armand Melendez
(74) *Attorney, Agent, or Firm* — John R. Ross; John R. Ross, III

(57) ABSTRACT

A resin infusion repair device and method for repairing a wooden boat deck having a repair area that includes voids between the planking of the boat deck and the as built surface under the boat deck planking. A vacuum cover provides an airtight cover of the repair area. A vacuum suction line is inserted into the vacuum cover. A vacuum pump is connected to the vacuum suction line and provides vacuum suction at the repair area. A resin supply line is inserted through the vacuum cover. A resin supply source is connected to the resin supply line. The vacuum pump provides a vacuum suction that draws resin from resin supply source through the resin supply line and into the repair area so that the voids are all filled with the resin. In a preferred embodiment, the wooden boat deck is a teak boat deck.

4 Claims, 11 Drawing Sheets

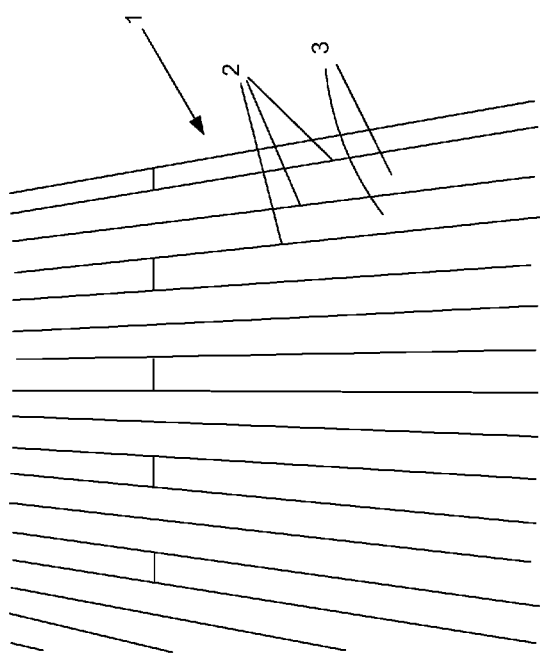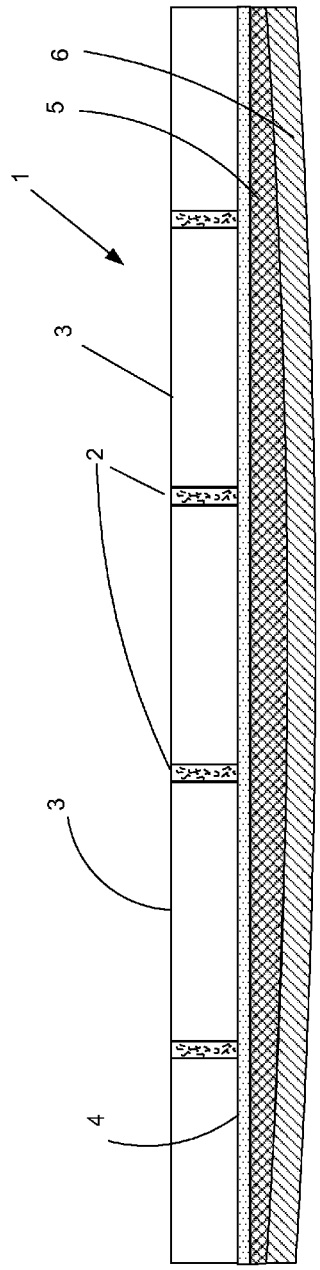
FIG. 1A
FIG. 1B

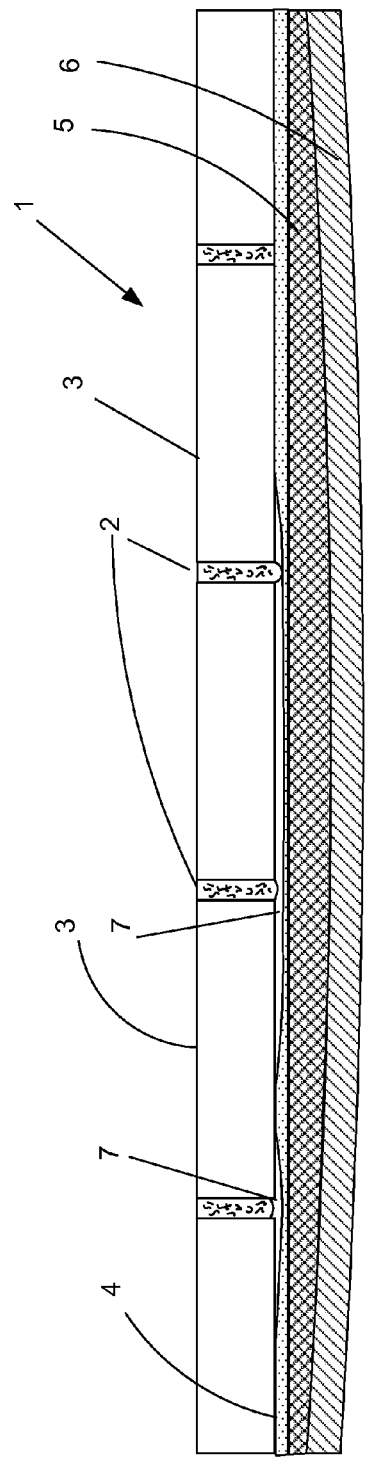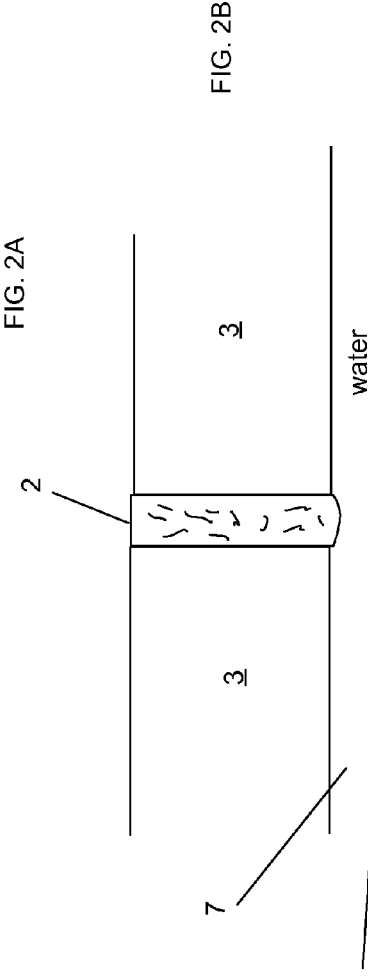

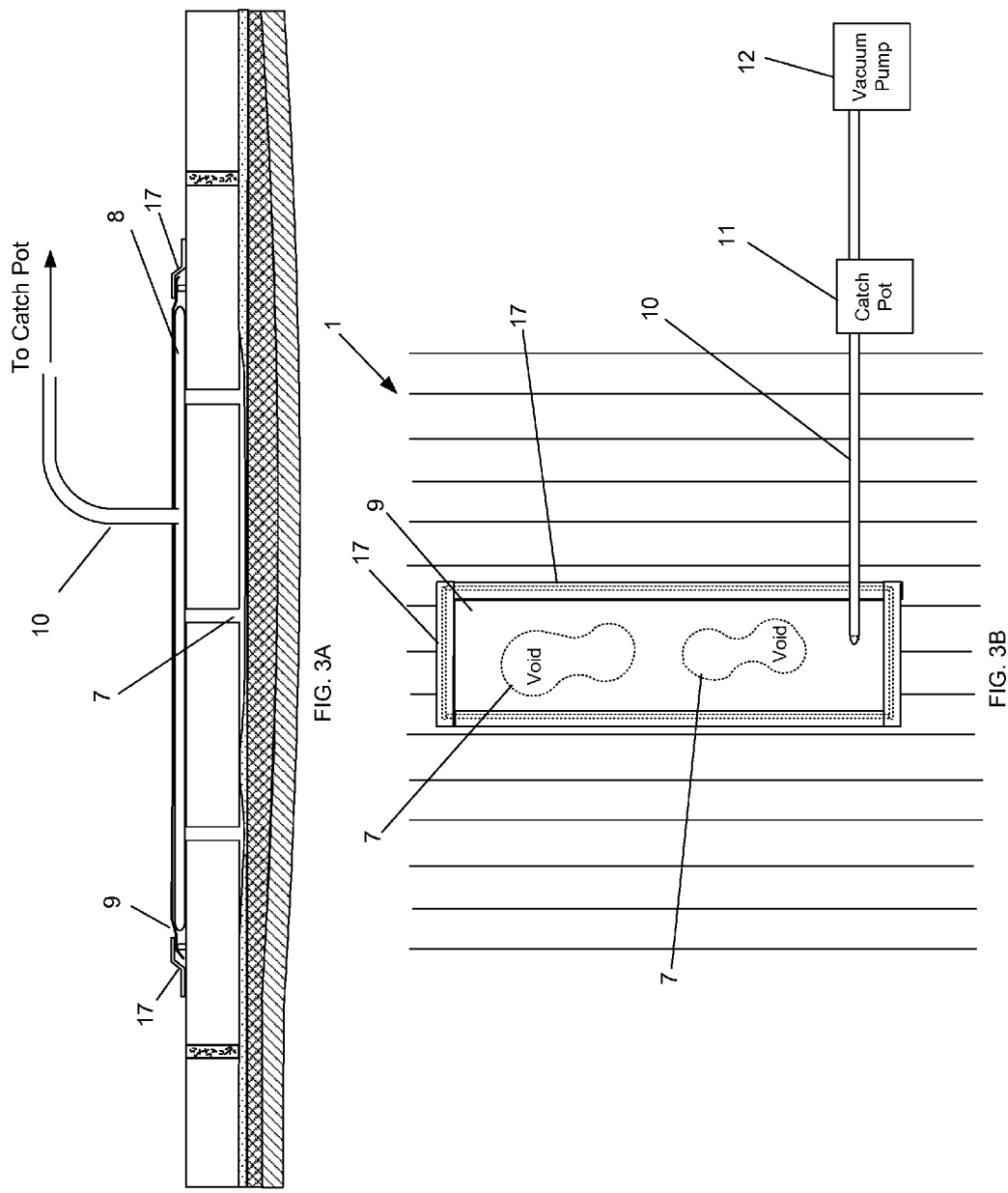

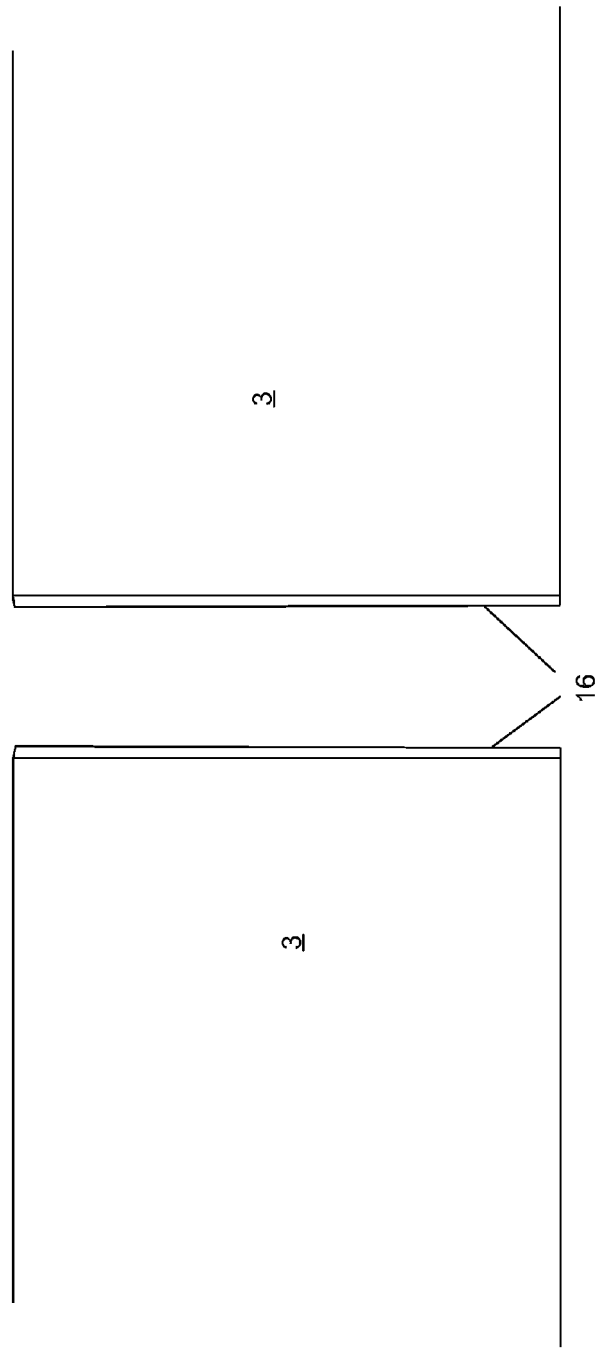

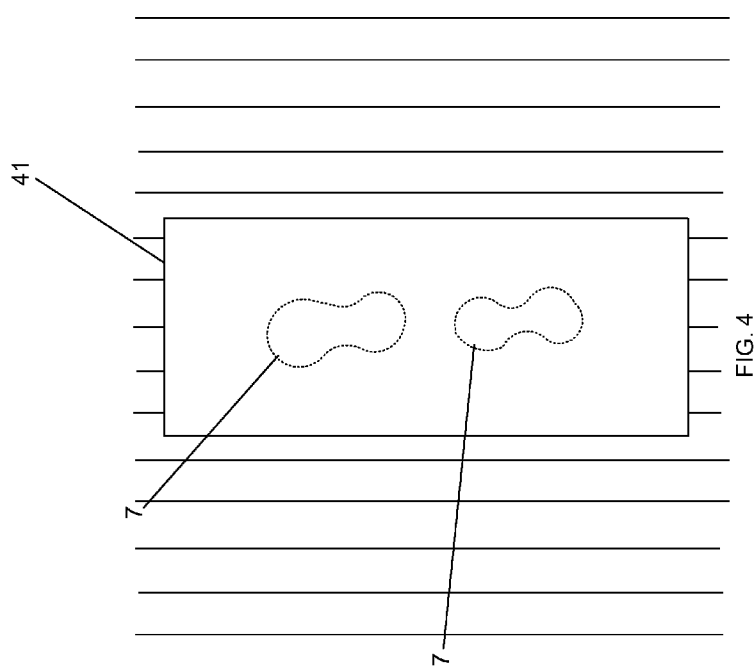

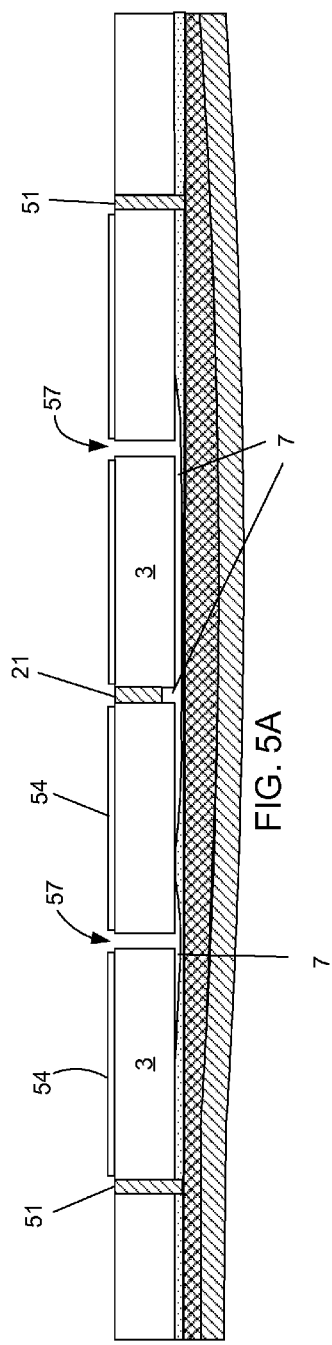

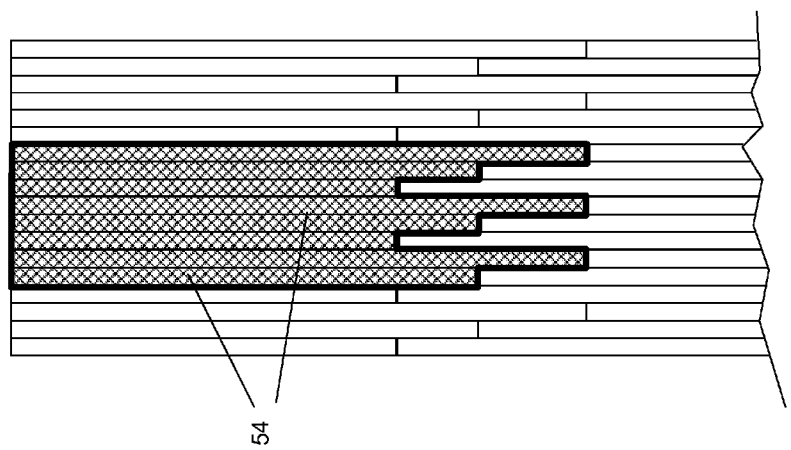
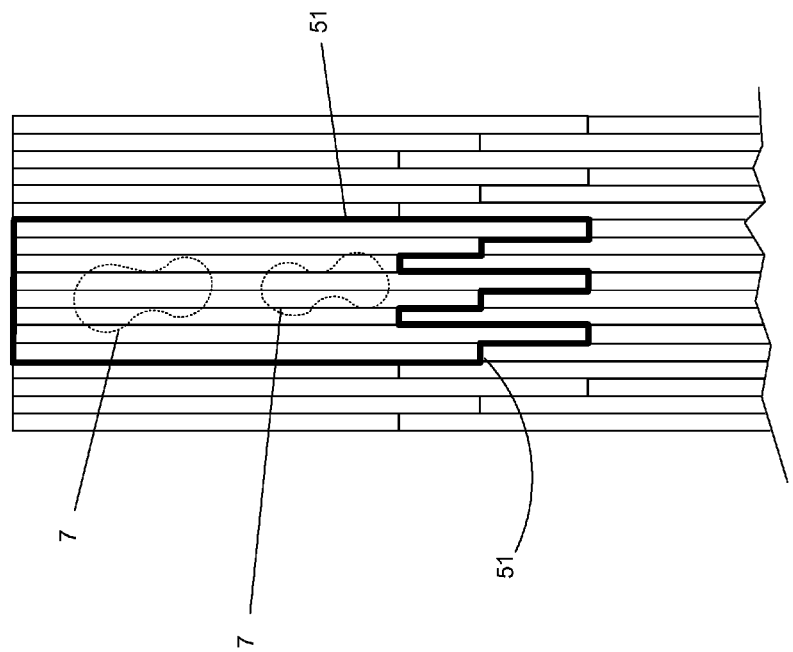

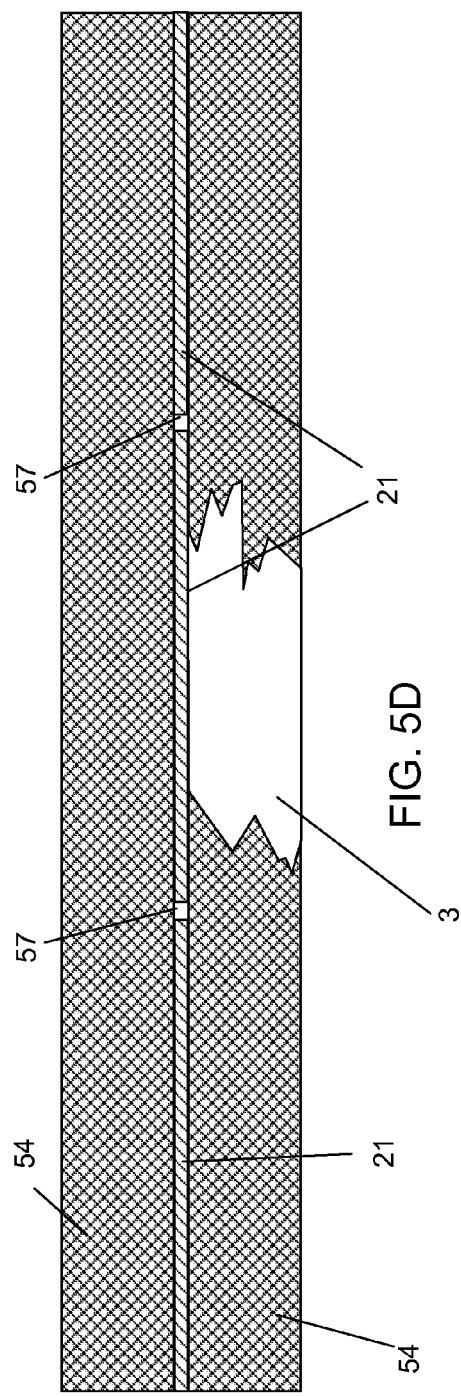

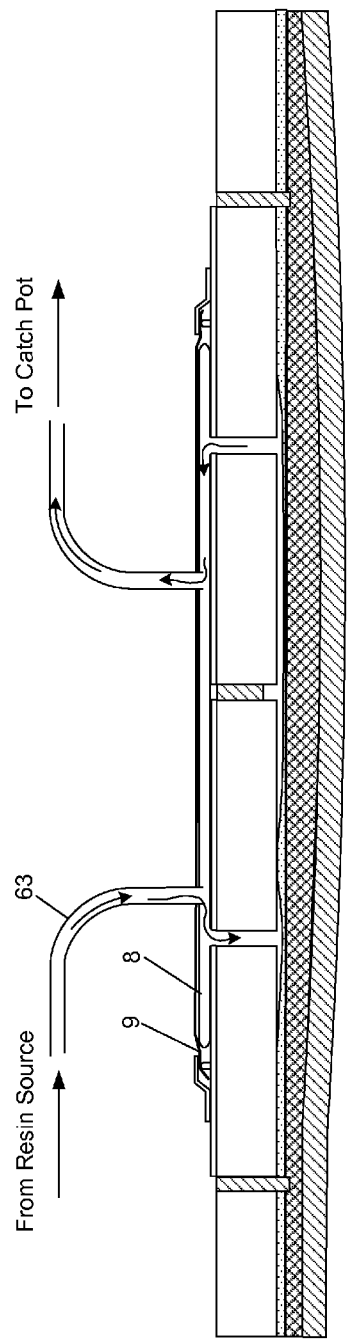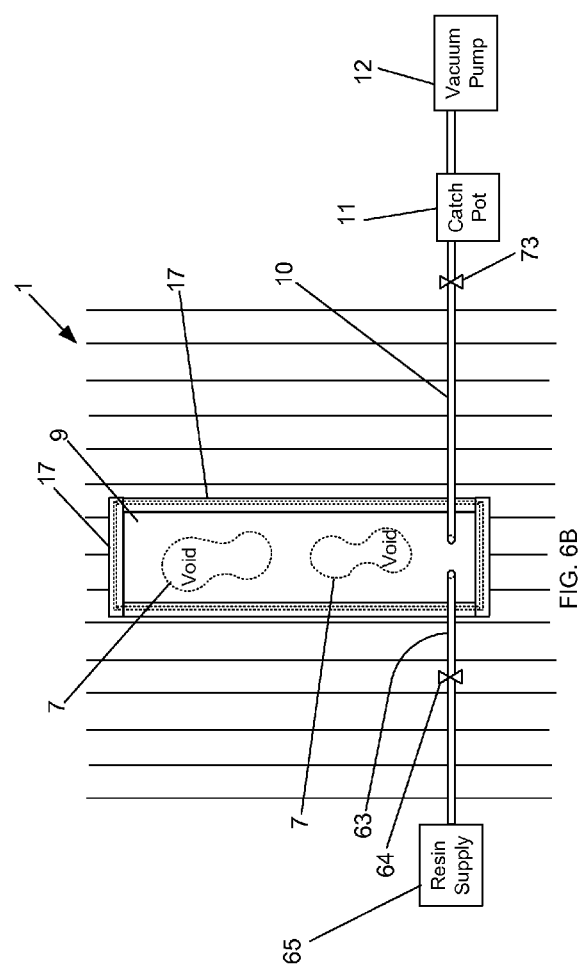

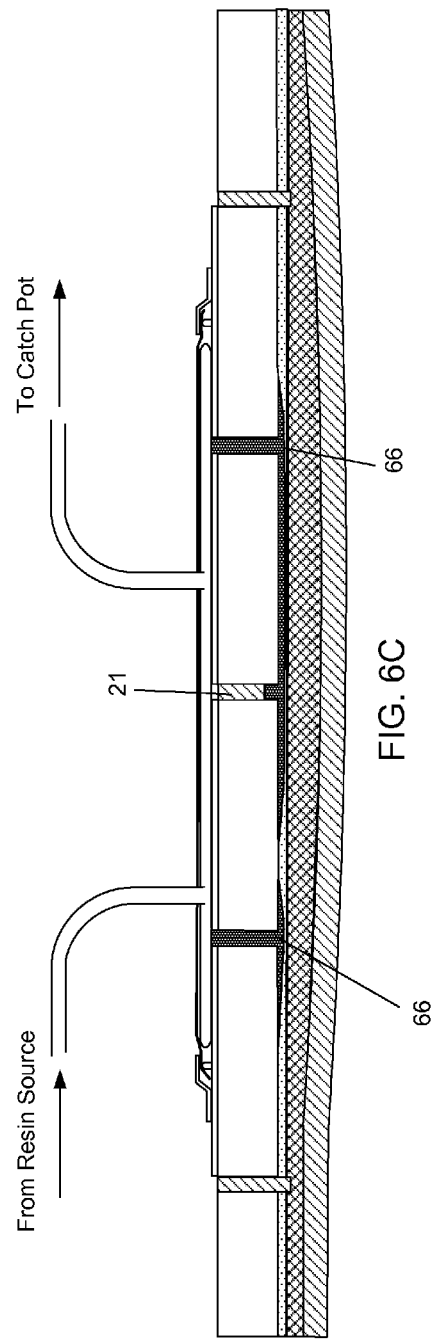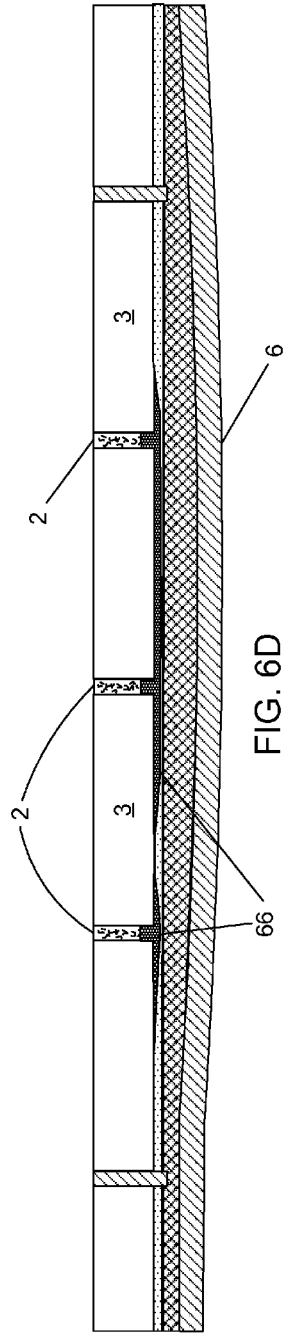

VACUUM INFUSED REPAIR DEVICE AND METHOD FOR TEAK DECKS ON BOATS, YACHTS AND SHIPS

The present invention relates to wooden decks for boats, and especially to repair methods of teak decks for yachts and ships.

BACKGROUND OF THE INVENTION

The quality of wooden decks for expensive yachts is very important. Typically, the top surface of these decks is natural teak wood separated with flexible joints (caulk seams) which allow the individual planks of teak (battens & trims) to expand and contract as the wood's moisture content changes with the surrounding environment. These elements (battens, trims and caulking) are always attached to a prepared surface which is normally the same material as the ship's hull. These materials include wood, alloy, steel, fiberglass, or others. This surface is called the "as-built surface" and it must be properly prepared before a teak deck is attached to it. This prepared as built surface is not part of the teak deck. However, the critical joint between these two surfaces, the teak deck and the prepared as built surface is part of the teak deck. In some cases, the teak elements are attached with mechanical fasteners to the surface below and more recently with adhesive only. However, sometimes both fasteners and adhesive is applied to secure the teak deck elements to the prepared as built surface below. Regardless of the method used the desired goal of the current art form of attaching a teak deck to the prepared as built hull surface of a boat, yacht or ship is to provide a permanent, void free, watertight bond between the two surfaces. However, it is a well-known fact that many teak decks are replaced well before the teak wears out. This is often due simply to the fact that a permanent, void free, watertight seal was not achieved between the teak elements and the prepared as built surface during the original installation process. This is distressing since these types of failures normally cause the early removal and replacement of the teak. When replacing an existing teak deck the new teak must be sourced from a limited supply of a rare natural resource.

Teak deck parts are limited in scope and the types of failures well known. The caulking can release allowing water between the caulking and the wood elements. The wood can fail or crack allowing water into the wood to the bottom of the crack. Water can get under the teak deck, between the teak elements and the prepared as built surface if a permanent, void free water bond was not achieved during the construction process. And adhesives and mechanical fasteners can fail for a number of reasons from simply not cleaning the surfaces to improper mixing. There is a clear difference between the normal effects of simple caulk seam failure or a random cracked batten vice the effects of water being trapped under the teak deck. In truth the caulk seams between the individual pieces of teak will fail sooner or later allowing water to seep to the bottom of the seam. It is also normal for a few battens of wood to develop cracks during their life time. There are simply too many seams and too many individual pieces of teak in a teak deck for these elements to remain perfect. When the caulking starts to fail or a random batten cracks on a properly installed teak deck, which has a permanent, void free, water tight bond between the teak elements and the prepared surface below it is not a significant issue. Water slowly working its way down a defective caulk seam or through a crack has no place to go once it reaches a permanent water tight adhesive joint. It is at this permanent, void free, watertight bond holding the teak pieces or teak panels in place that the deck remains structurally sound even if water is in the seams or in cracks in the wood. These water filled seams or water filled cracks of wood do create a problem but one which can easily be remedied by re-seaming the teak deck or replacing a few pieces of defective teakwood. These actions restore the teak deck's water integrity and extend its service life. In other cases, the result of water migrating down through the caulk seams or cracked battens is likely to allow water to penetrate into one of many voids between the teak elements and the prepared hull surface, filling them with water. These voids normally result from a defective installation process, or are created by one of a multitude of possible adhesive failures, or for other reasons.

Any leakage of water from the top surface of a teak deck downward allowing fluid to become trapped in the underlying structure is often catastrophic and can lead to the early structural failure of the entire teak deck necessitating its replacement. This situation can worsen as corrosion of the yacht's structural surfaces can begin. This is due to the fact that "trapped fluid" normally cannot escape, and because fluid is not readily compressible, it is the cause of many teak deck failures. Water trapped in a space under the teak deck acts as a hydraulic fluid when pressure is applied to the top surface (someone stepping on the deck above the area with water filled voids). The water is forced outward creating a larger space in the underlying deck, opening more caulk seams, filling more voids, and causing the teak to further separate from the prepared hull surface. This larger space can now accept more water entering from ever expanding failures. The process often accelerates as water is the world's most common universal corrosive agent: corrosion begins, adhesives fail, fasteners fail, caulking fails, and the teak deck releases. New teak from the rain forest is then required to replace it.

To fully understand the background, a more detailed description of a teak deck's construction is required. The traditional method used for decades by shipwrights around the world is a well-known art and involves planking the deck by independently shaping and attaching each individual strip or batten of wood with mechanical fasteners, some type of adhesive, or both. A newer method was described in U.S. Pat. No. 4,351,256 filed in February of 1980. It involves constructing a teak deck off the boat, using a backing material, and then taking the teak deck in large panels to the yacht for installation. This method is again secured with mechanical fasteners, adhesives or both. In either case the procedure begins with the existing structure or skin of the ship which can be described as the "as-built deck". An alternate technique for installing teak decks is described in U.S. Pat. No. 7,506,598 issue to Applicant.

As-built decks are normally made of the same material as the ship; i.e., steel, aluminum, fiberglass, epoxy, or wood. Regardless of the material, the as-built deck is almost always uneven and unprotected. Prior to covering it with teak wood, the as-built deck must first be cleaned and protected with some kind of coating or primer to protect it from corrosion and other damage. Following the primer coat (or coats), these uneven decks must be filled with a fairing compound to make them smooth and to make them conform to a desired camber, sheer, and or slope. This will ensure water drains from the finished deck to the desired drain locations. Proper fairing of the as-built deck is critical to ensure the final covering of wood is smooth and that there are no voids underneath it. In fact, improper fairing alone can account for many deck failures as the wood elements could not be properly pressed into the valleys and over the highs of a rolling improperly faired as built surface. One of the reasons to add fairing to an as built surface prior to installing the teak deck is to provide a perfectly smooth surface. For some projects after the fairing is completed, the entire area is covered with plywood to provide cleat stock, insulation, expansion and a more suitable surface to attach a wooden deck. It is easier to glue and screw into plywood than steel, fiberglass or aluminum. This procedure is normally referred to as "sub-decking". The top of the sub-deck now becomes the prepared as built surface to which the teak deck will be attached. Once the as-built deck has been faired, and or sub-decked to the desired lines (camber and sheer) and smoothness, the final teakwood covering is attached.

The attachment of the teak deck to the prepared hull surface is the most important structural joint affecting the overall life of a teak deck. The attachment techniques used at this critical joint include mechanical fastenings (screws, bolts, or studs), some type of adhesive (polysulfide, polyurethane, silicon, epoxy, etc.), or both mechanical fasteners and adhesives. It is noted that the current trend is away from mechanical fasteners and toward fasten-less teak decks set only in a selected adhesive. Attaching a teak deck without fasteners eliminates the teak plugs and provides for a clean and neat appearance. However, these installation techniques are problematic and it is difficult, but not impossible, to obtain the necessary permanent, void free, and water tight bond critical to give the teak deck a long life. When a teak deck is installed without fasteners, there is no backup to keep the deck in place if the adhesive fails. Therefore, cleaning must be done, adequate adhesive must be applied, adequate evenly applied pressure (with the use of weights, pressure bars, pressure sticks, vacuum, or other means as specified by the adhesive manufacturer), drying times observed; and in all cases careful attention must be paid to the manufacturer's mixing and application instructions. It is critical to properly mix the adhesive, properly apply the adhesive, and use adequate amounts of adhesive. Failure to properly accomplish even one of these steps, or failing to get the adhesive in to the teak deck during its "open" time or applying inadequate or uneven pressure on the teak to press it down into the adhesive are all reasons why many teak decks are completed without permanent, void free, and watertight joints between the bottom of the teak and the prepared as built hull surface. Often this fact goes without notice or it is initially considered acceptable. A new teak deck with new caulking is unlikely to allow water into any voids during the normal 12 to 24 month warranty period. If it is 70 percent attached, it is well-fixed to the hull; and with the assistance of gravity it may remain structurally sound during this period. The fact that it has voids between the teak and subdeck surface is not immediately critical. However in time, sometimes sooner than later, the caulk seams will start to fail or a single batten will crack allowing water into these voids. This is when problems will present themselves. At this point, the teak deck begins to immediately show signs of structural failure and the process of structural damage to the hull begins. The current art of repair is to replace the caulking or replace the defective wood in an attempt to re-establish the watertight integrity of the overall teak deck. Often the most defective area is ripped out and replaced. Little attention has been given to a method or system to correct the real structural issue. These are the voids between the teak and the prepared hull which allows a place for water to trap and destroy the deck through hydraulic action.

What is needed is a better method for repairing teak decks having water trapped in voids between the teak deck and the as-built surface.

SUMMARY OF INVENTION

The present invention provides a resin infusion repair device and method for repairing a wooden boat deck having a repair area that includes voids between the planking of the boat deck and the as built surface under the boat deck planking. A vacuum cover provides an airtight cover of the repair area. A vacuum suction line is inserted into the vacuum cover. A vacuum pump is connected to the vacuum suction line and provides vacuum suction at the repair area. A resin supply line is inserted through the vacuum cover. A resin supply source is connected to the resin supply line. The vacuum pump provides a vacuum suction that draws resin from resin supply source through the resin supply line and into the repair area so that the voids are all filled with the resin. In a preferred embodiment, the wooden boat deck is a teak boat deck.

BRIEF DESCRIPTION OF THE DRAWINGS

FIGS. 1A and 1B show a structurally sound teak boat deck.

FIGS. 2A-2B show a repair area with water filled voids.

FIGS. 3A-3B show a repair area covered with a vacuum cover.

FIG. 3C shows details of a seam.

FIG. 4 shows a heat tunnel over a repair area.

FIGS. 5A-5D show details for isolating a repair area.

FIGS. 6A-6D show details for infusing the repair area with resin.

DETAILED DESCRIPTION OF THE PREFERRED EMBODIMENTS

Figure 1C:
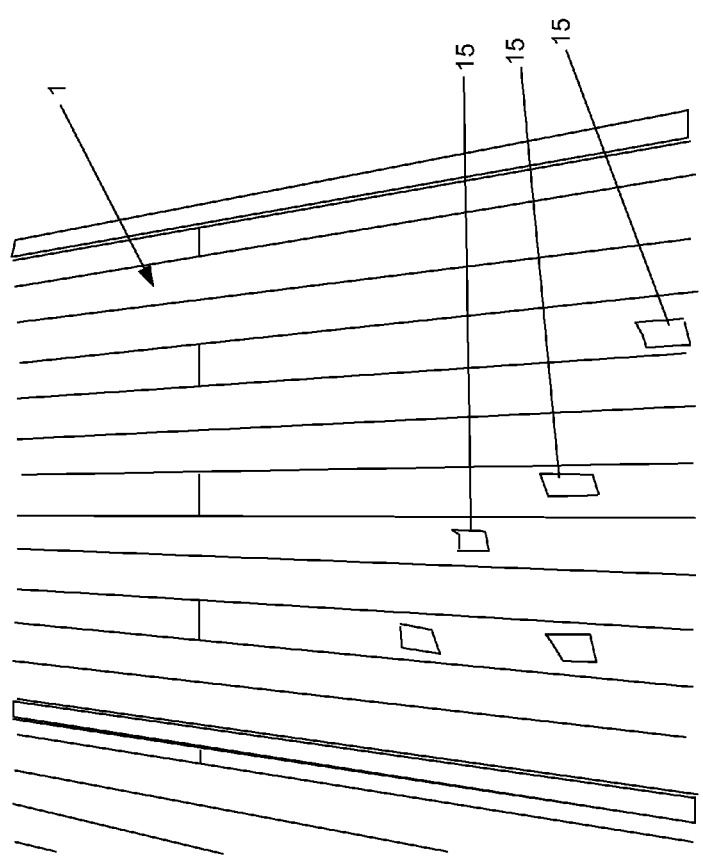
FIG. 1C shows a teak boat deck with marked with tape.

FIG. 1A shows a top perspective view of several meters of a teak deck 1. FIG. 1B shows a side view of teak deck 1. Elements of the teak deck include caulk seams 2, teak planks 3, glue 4, leveling 5, and as-built surface 6.

Inspect the Deck for Damage

A visual inspection is accomplished if a teak deck has suspected damage. Preferably tapping, moisture measurements and infrared camera readings are accomplished during the initial nondestructive inspection phase. A detailed marking of both sound and suspected defective areas is accomplished to make a determination if further invasive testing is justified. A quick inspection of the elements will tell the condition of the deck. The inspector will be looking to see if the wood is of high or low quality, is the wood split, worn, or damaged, or if there is an appearance of deep valleys resulting from the erosion of the soft grains. The inspector will be looking at the condition of the caulking. The inspector will be looking to see if the caulking is soft, pliable, and still adhered to the teak on both sides of the seams. If not, the inspector will look to see if water is being held in the seam joints. The inspector will look to see if there is evidence of water being held below the seams and or even below the teak elements. The inspector preferably stands on the deck and jumps up and down. He will look to see if the teak deck elements move and is water forced up through the defective seams skyward. The inspector will preferably mark the results on the deck (FIG. 1C). Teak deck 1 has been marked with masking tape 15 to show areas of suspected water filled voids below teak deck 1. For example, FIG. 2A shows a side view of teak deck 1 having voids 7. Water is trapped in voids 7 (see also FIG. 2B).

After the initial inspection is completed the process of recommending corrective actions may begin. The inspector makes a determination if the deck is solid and only needs a few small caulk seam repairs, or if it needs a complete re-seam. The inspector may determine that there is evidence of hollows or voids under the teak deck or worse, voids filled with water. In some cases more invasive testing is justified.

Often the correct choice is to continue the inspection process with a minimally invasive process of removing some or all the caulking in specific areas. To begin, a limited amount of caulking is preferably removed from the middle of the seams in the defective areas slightly deeper than the thickness of the teak battens and trims. Preferably a thin layer of caulking 16 is left on each vertical surface of the teak planks 3 (FIG. 3C). This small amount of caulking can be used to seal a sacrificial spline (if it becomes necessary) and to prevent the vertical teak surface from being saturated if the area must be infused with the resin. For an existing teak deck which is 16 mm thick with 4 mm wide seams the initial relief cut would be a 3 mm groove and 17 mm deep down the middle of each seam. This also creates connectivity to voids 7 (FIGS. 3A-3B) which can hold liquid.

The objective of the invasive open and inspection techniques is to further view and inspect the joint between the teak elements and as-built surface 6. The inspector checks to see if there is water in the bottom of the seam and is it isolated to the seam or does it penetrate under the teak battens and trims. If the water is isolated to the bottom of the seams, then the adhesive between the teak elements and the prepared hull is watertight. In this case the inspector should close the seams, clean and install new caulking, and then document the area as structurally sound.

However if water extends under the teak, then hollows or voids are present and more aggressive corrective measures should be considered. The inspection then continues. Materials for the inspection preferably include: a moisture meter with remote pins, a mini bore scope with a 3.0 mm to a 3.5 mm flexible lead which is lighted and fixed to a recorder or camera, the human eye, and thin metal probes which can be moved to test for hollows or voids, and infrared cameras. The use of sophisticated modern equipment will minimize damage and maximize discovery. The invasive open and inspect process may also require the removal of a limited amount of wood to inspect the condition of the as-built surface to check for corrosion. All removed wood is preferably documented, repairs executed and the wood replaced at this time. As discoveries are made the defects are preferably documented to show areas of standing water, voids, loose wood, split wood or other structural failures in any element of the teak deck.

Remove Water from the Voids

After a determination has been made that there are water filled voids beneath the deck, the next step is to remove the water from the voids. The inspector defines and marks the repair area by marking battens port and starboard and stagger joint to stagger joint forward and aft. A perimeter of tacky vacuum seal tape 17 is applied around the repair area (FIGS. 3A-3B). FIG. 3A shows a side view and FIG. 3B shows a top view of teak deck 1 covered with a vacuum distribution blanket 8 and vacuum film 9. Caulk seams 2 (FIG. 2A) have been removed to allow for greater vacuum suction. Vacuum line 10 is inserted through vacuum film 9 and connects to vacuum blanket 8. Vacuum suction is applied to remove water trapped in voids 7. The water collects in catch pot 11. Vacuum suction is applied via vacuum pump 12.

Vacuum is applied at approximately 0.8 Bar and the trapped moveable water is readily removed. Preferably, the vacuum is applied for up to 12 hours to ensure water from under the surrounding areas is also evacuated. Voids 7 may extend and connect to other voids 7 several meters in all directions. Preferably, the vacuum pump is turned off occasionally and the catch pot is drained during the process to avoid damaging the vacuum pump with overflow water until all standing or moveable water is removed. After the water has been removed from the affected area, vacuum blanket 8 is removed.

Utilize Heat to Dry Out the Repair Area

As epoxy does not stick to material with high moisture content (surfaces saturated with water) the treated area must still be dried further. This is accomplished with the use of heated air which is forced over, above, and through the area being treated. FIG. 4 shows heat tunnel 41 covering the area being treated having voids 7. In a preferred embodiment heat tunnel 41 is fabricated from ridged closed cell insulation foam. The heat under heat tunnel 41 is closely regulated to obtain a desired temperature and moisture can be observed rising, collecting on the top of the tunnel and then evaporating out through the exhaust vents. Preferably, controlled heat is maintained in the tunnel for 24 hours or longer. The surfaces are checked with a moisture meter. The area is reheated as necessary until moisture meter readings are observed at lower than 20 percent in all accessible areas. In other preferred embodiments, a heat blanket, heated tent or other heated controllable environment can be used to dry the excess moisture from the deck elements.

Isolate the Repair Area

Once dry the repair area must be isolated by filling the perimeter seams with a two part epoxy resin. FIG. 5A shows splines 51 inserted into the seams to surround the repair area on each side. This procedure effectively isolates the repair area so that a vacuum can be drawn to very high pressures. If the perimeter is not properly sealed, air could be drawn from areas many meters past the repair area limiting the effectiveness of the infusion method. FIG. 5B shows a properly isolated repair area. Resin splines 51 surround voids 7 so that a proper vacuum may be drawn.

Mask the Top of the Teak Planks

A preferred two part epoxy resin used in the infusion process is very thin. During the infusion process it is drawn into the teak surface like a penetrating epoxy. It is therefore necessary to seal and protect the top of the teak elements and trims from this process as filling the top surface of the teak with penetrating epoxy is not a desired effect. Placing protective tape 54 on the top surface of the teak planks will prevent epoxy from penetrating into the top surface of the teak during the resin infusion process (FIGS. 5A and 5C).

Fill Seams with Sacrificial Filler

As shown in FIG. 5D, the cut-out seams are filled with a sacrificial filler 21. Filler 21 limits the amount of epoxy wasted and makes the cutting of a final new seam much easier. In one preferred embodiment filler 21 is closed cell foam. In another preferred embodiment filler 21 is wood strips. Filler 21 preferably extends approximately 75 percent down from the surface of teak planks 3 (FIG. 5A). Also, preferably, filler 21 includes one-inch wide opening 57 (FIG. 5D). Opening 57 allows for the infusion of resin into void 7 under filler 21 and planks 3.

Infuse the Repair Area with Resin

FIG. 6A shows resin infusion line 63 inserted through vacuum film 9 and vacuum blanket 8. Initially valve 64 is closed, valve 73 is open and vacuum pump 12 is started. When a negative pressure of approximately 0.8 bar is achieved, valve 64 is opened and two part epoxy resin 66 stored in resin supply bin 65 is drawn into the area under vacuum film 9. Resin 66 will quickly fill all voids 7 and the area of the seams below filler 21. Resin will also fill into openings 57 where resin 66 (FIG. 6C) is drawn via vacuum pump 12 (FIG. 6B) until resin has completely filled all voids and openings and the overflow of resin is drawn into catch pot 11. Valves 73 and 64 are then closed and vacuum pump 12 is stopped. The area under vacuum film 9 is maintained under vacuum while resin 66 dries.

After resin 66 has dried, filler 21 is cut away. In the preferred embodiment resin 66 will remain in the lowest 20 percent of each seam creating a permanent water tight void free bond between the teak elements and as-built surface 6. For example in a 20 mm seam, the epoxy preferably will fill the lower 4 mm of the seam. The seams are then all caulked utilizing caulking material 2 (FIG. 6D). Finally, teak deck 1 is preferably cleaned, sanded and detailed so as to have a visually pleasing, void free, structurally sound teak deck.

Although the above-preferred embodiments have been described with specificity, persons skilled in this art will recognize that many changes to the specific embodiments disclosed above could be made without departing from the spirit of the invention. For example, the above preferred embodiment described electric forced air heaters and a foam core heat tunnel to remove excess moisture from the teak deck. In another preferred embodiment one could use gas fired heaters with a heat blanket. Similarly in the preferred embodiments described above the sacrificial splines are made from scrap teak. In an alternate embodiment, they could be made from high density foam or pine. In the preferred embodiments described above moveable fluid is removed with a high pressure vacuum pump, vacuum blankets and high pressure suction. In an alternative method vacuum cleaners could be used to achieve lesser quality results. Therefore, the attached claims and their legal equivalents should determine the scope of the invention.

What is claimed is:

1. A method for repairing a teak boat deck, built on a leveling surface or an as-built surface, said teak boat deck having a repair area that includes at least one void between teak planks of the teak boat deck and the leveling or as-built surface under the teak boat deck, said method comprising the steps of:
    A. inspecting the boat deck for damage and the presence of said at least one void,
    B. determining the presence of water in said at least one void,
    C. providing boat deck repair components comprising:
        1) a vacuum cover system for providing a vacuum region over the repair area, said vacuum cover system comprising:
            a) one or more vacuum blankets for covering the repair area,
            b) vacuum film covering the vacuum blanket, and
            c) tape for taping the vacuum film to the boat deck,
        2) a vacuum suction line for insertion into the vacuum cover system,
        3) a vacuum pump connected to said vacuum suction line for providing vacuum suction at the repair area,
        4) a resin supply for line for insertion into the vacuum cover system,
        5) a resin supply source connected to the resin supply line,
    D. taping the vacuum film to the boat deck and utilizing vacuum suction the vacuum cover system, the vacuum suction line and the vacuum pump to remove water from the at least one void in the repair area,
    E. utilizing a heat tunnel, a heat blanket, a heated tent or other heat source to remove moisture from the repair area,
    F. isolating the repair area by filling perimeter seams between the planks with an epoxy resin to produce splines down to the leveling or the as built surface to isolate the repair area to produce a perimeter boundary below the boat deck to prevent undesired travel of resin,
    G. masking tops of the planks within the repair area with protective tape,
    H. filling at least some of the seams within the repair area with sacrificial filler,
    I. covering the repair area with one of the one or more vacuum cover systems, to create a vacuum region bounded by the vacuum film, the perimeter boundary and the leveling or the as built surface,
    J. inserting the vacuum suction line into the vacuum region,
    K. connecting a vacuum pump to said vacuum suction line to provide vacuum in the vacuum region,
    L. inserting a resin supply line into the vacuum region,
    M. connecting a resin supply source to said resin supply line,
    N. turning on said vacuum pump to provide a vacuum suction that draws said resin from said resin supply source through said resin supply line and into said repair area so that said at least one void is filled with said resin, and
    O. after the resin has dried cutting the sacrificial filler away allowing resin located below the sacrificial filler to remain to create a water tight void free bond below the teak planks.

2. The method as in claim 1, further comprising a catch pot connected to said vacuum suction line between said vacuum cover and said vacuum pump.

3. The method as in claim 1, wherein said resin is a two part epoxy resin.

4. The method as in claim 1, wherein the teak boat deck is the boat deck of a yacht.

* * * * *